Sept. 1, 1964        J. Y. GLASS ET AL        3,147,137
ELECTROSTATIC SPRAYING OF POLYURETHANE FOAM
Filed Oct. 31, 1960        3 Sheets-Sheet 1
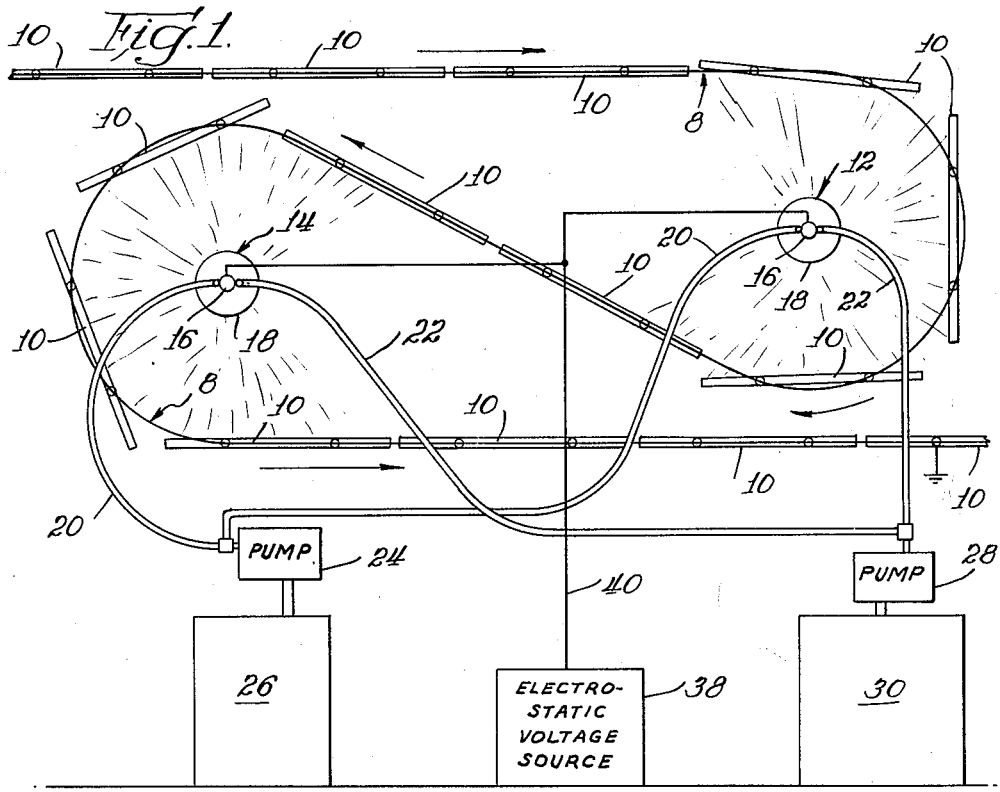
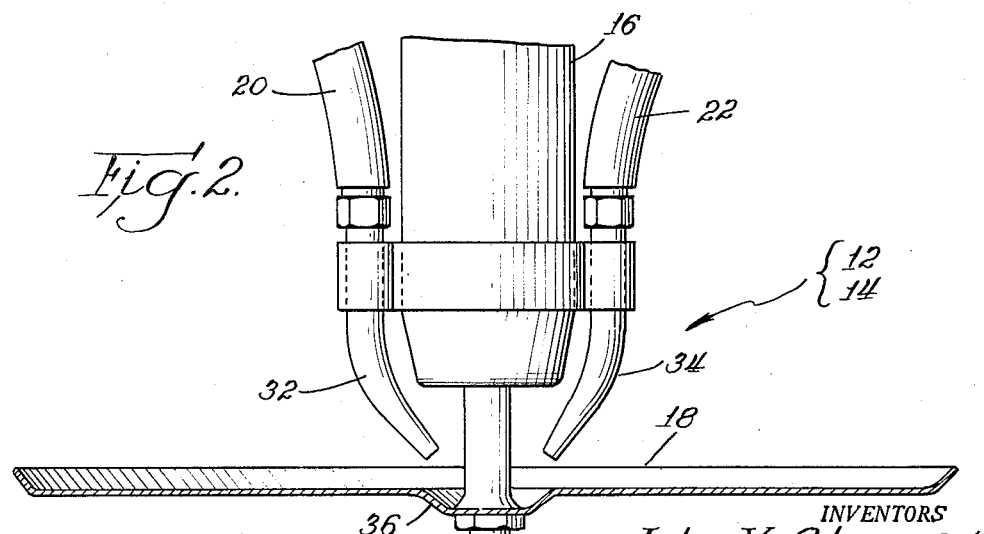
INVENTORS
John Y. Glass and
James L. Amos

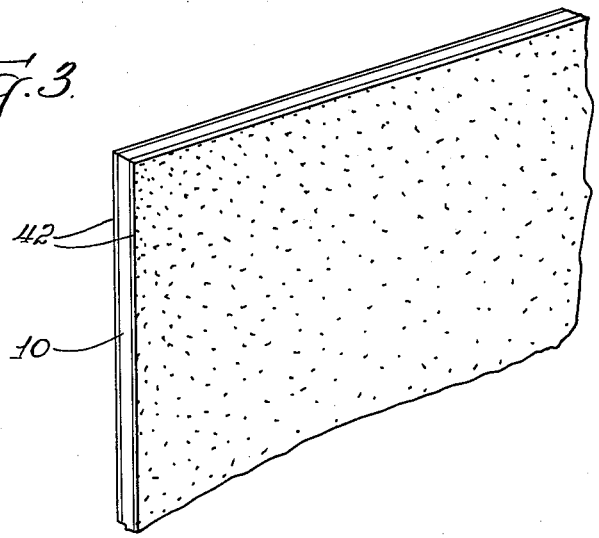
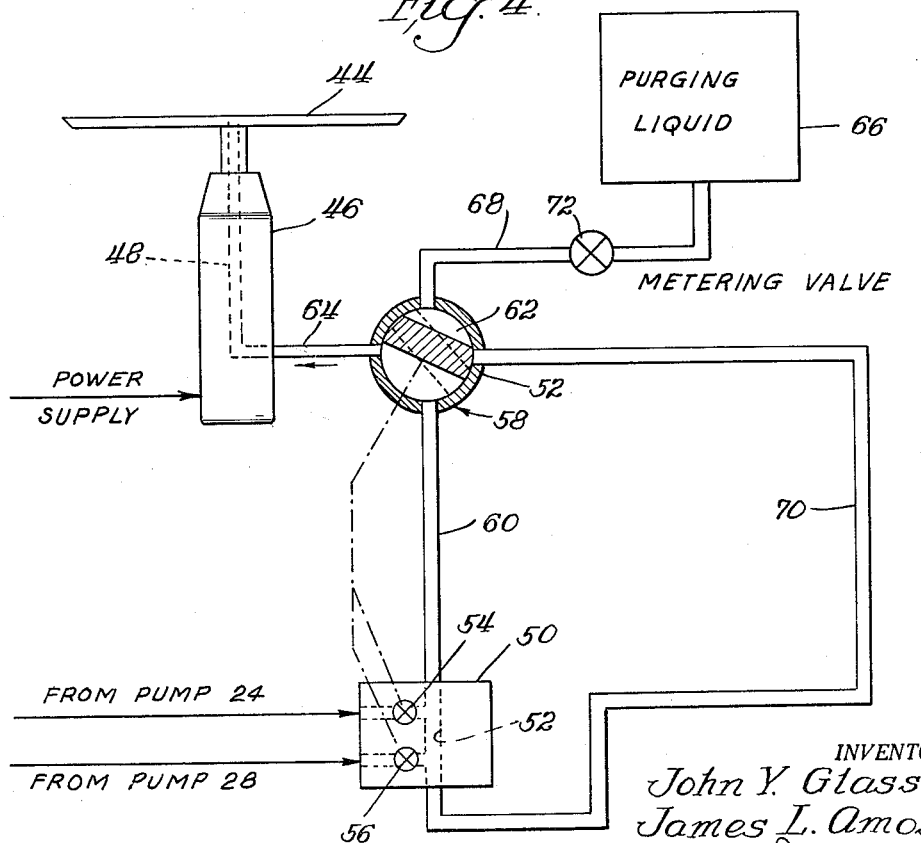

United States Patent Office 3,147,137
Patented Sept. 1, 1964

3,147,137
ELECTROSTATIC SPRAYING OF POLY-
URETHANE FOAM
John Y. Glass and James L. Amos, Midland, Mich., assignors to The Dow Chemical Company, Midland, Mich., a corporation of Delaware
Filed Oct. 31, 1960, Ser. No. 66,385
7 Claims. (Cl. 117—93.4)

This invention relates to a method for foam coating articles of manufacture by the electrostatic spraying of polyurethane foam.

The use of electrostatic spraying apparatus for coating articles with solid film deposits of paint, epoxies, and the like, is a well known industrial practice. Apparatus for such spraying is disclosed in various patents, including U.S. 2,754,226; 2,809,902; and 2,926,106. However, such apparatus and associated methods generally involve the use of single components.

On the other hand, the present invention relates to a two component system. More particularly, the present invention involves the mixing of urethane polymer foam-producing ingredients so that the resulting foam will be delivered to the spraying apparatus in a manner which insures the most effective coating of an article with an advantageous and beneficial layer of foamed polyurethane.

The method of the invention may be utilized for many different applications such as, the spraying of uneven shaped objects, i.e., cylindrical, spherical, pipe, tubing, etc., or spraying of automobile bodies, aeroplane fuselages, and ship hulls, etc., or to fabricate insulating articles that involve facing materials and successive layers of polyurethane foam.

Of special interest is the electrostatic foam coating of foam-type plastic sheets or the like plastic foam substrates with polyurethane foams. It has been found that a thin coating of polyurethane foam applied to a core formed of an alkenyl aromatic olefin polymer resin will provide a composite material of superior characteristics. Such a composite material will, amongst many other desirable things, be water impervious, heat and solvent resistant, of light weight, will have a low "K" factor (B.t.u./(hour)(feet$^2$)(° F./in.), and will display relatively high impact, flexural and compressive strength. A composite product of this general variety has been disclosed in the copending application for United States Letters Patent of John Y. Glass, Serial No. 17,912, filed March 28, 1960, which issued as Patent No. 3,029,172, on April 10, 1962.

At least commensurately good results are acheved by practice of the present invention to polyurethane foam coat other plastic foam substrates including those of either the thermoplastic or thermoset variety.

The main object of this invention is to provide an improved method for foam coating articles of manufacture by the electrostatic spraying of a urethane polymer foam.

A more specific object is to provide a method for electrostatically foam coating a core of an alkenyl aromatic polymer or polyolefin resin with polyurethane foam.

These and further objects and features of the invention are even more apparent from the following description and accompanying drawings wherein:

FIG. 1 is a composite schematic illustration showing an operational setup utilizing the method of the invention, the upper half of the illustration being a plan view, while the lower half is a vertical view;

FIG. 2 is a partial vertical view of a portion of an electrostatic spraying unit showing an arrangement for mixing polyurethane ingredients upon an atomizing disc of the unit;

FIG. 3 is a perspective view of a portion of a foam-type plastic sheet which has been coated on both sides with polyurethane according to the method of the invention;

FIG. 4 is a schematic view showing an operational setup for applying a premix polyurethane composition to an electrostatic spraying apparatus;

Figure 5:
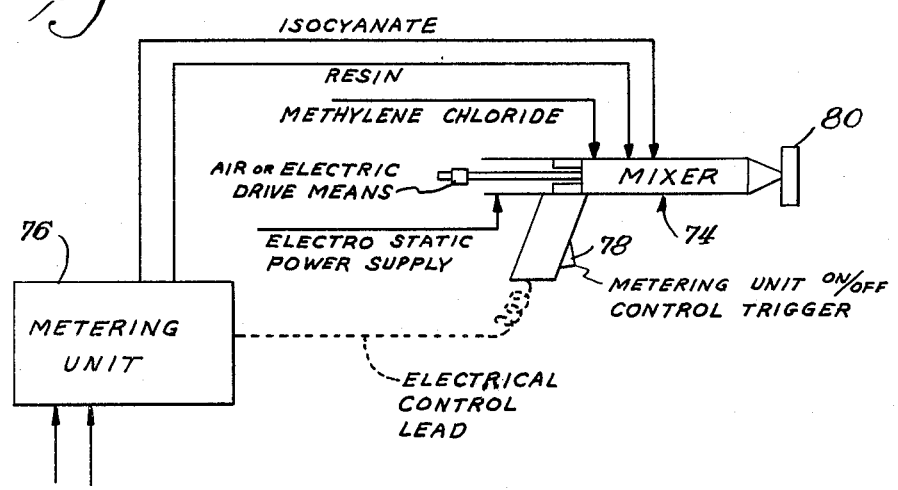
FIG. 5 is a schematic view showing an operational setup for use of the method of the invention with an electrostatic spray gun; and, FIG. 6 is a schematic view showing an operational setup for use of the method of the invention with an electrostatic spray gun, wherein a recirculation of spraying ingredients is provided.

Referring now to the drawings, and more particularly to FIG. 1, the upper portion of the figure illustrates an overhead chain conveyor line 8 whereby articles, such as flat sheets of material 10, which are to form the core of an article of manufacture, are suspended for movement in a reverse curve path as indicated. At the center of each of the two curved portions of the path are spraying stations 12 and 14. These are arranged so that one side of each sheet is first sprayed by station 12 and the opposite side of each sheet is sprayed by station 14, in sequential order. The conveyor line 8, and hence the sheets 10, are grounded. This ensures that electrostatically charged particles dispelled by the spraying stations will be attracted to the sheets which results in the uniform coating thereof in accordance with the method of the invention.

Of course, as is obvious, appropriate operations may be followed if it is desired to coat only one side (or other limited portion) of a given substrate with the urethane polymer foam. For example, the polyurethane can be sprayed on only one side or part of the substrate or masking practices followed.

Each spraying station 12, 14 includes a motor means 16 adapted for the high speed rotation of an annular-edged flat horizontal disc 18 which is suspended therefrom. Each disc 18 is adapted for the atomization of spray mixture placed thereon. Means (not shown) are provided to cause vertical reciprocal movement of the motor means and attached disc, such movement being substantially equal to the vertical dimension of each sheet 10. Each spraying station has two hoses 20, 22 connected therewith. Hose 20 leads from a pump 24 adapted to pump ingredients from a tank 26. Hose 22 leads from a pump 28 adapted to pump a second ingredient from a tank 30. Hoses 20 and 22 have nozzles 32 and 34 respectively. The nozzles are arranged to direct the material carried by each hose unto a dished portion 36 of the disc 18. In this way, the ingredients of a polyurethane foam are delivered in unmixed manner to the disc 18 for mixing thereon. An adequately high voltage electrostatic source 38 of, say, 100,000 are so volts is connected by wire means 40 to each spray station for generating a high electrostatic charge on the particles of spray which are produced by the rotating disc.

If desired, more than a single revolving disc unit may be employed in any preferred way for coating articles in a given urethane polymer foam coating installation or spraying station, including two or more units in tandem or other disposition on one or opposite sides of the substrate being coated. This may oftentimes result in a more uniform or otherwise more effective and efficacious application of the foam coating.

Regarding the ingredients for the polyurethane foam coating used in the method of the invention, a suitable mixture can be formed according to the following recipe (wherein all parts are specified by weight):

About 48.25 parts of butylene oxide prepolymer adduct is prepared by reacting a glycerine-butylene oxide triol having a molecular weight of about 500 with sufficient tolylene diisocyanate to give a free NCO content. To this, about 24.9 percent, about 0.55 part of 2,2,1-diazabicyclooctane and 0.30 part of a water-soluble silicone surfactant are added with the entire composition being in the tank 26. A mixture of 35.9 parts of butylene oxide crosslinker (prepared by reacting a mixture of 40 percent glycerine and 60 percent sucrose with sufficient butylene oxide to give a resin containing about 14.15 percent OH) and about 15.0 parts of trichloromonofluoromethane is placed into the tank 30. Control means (not shown) associated with the pump means, are adapted to operate the pumps 24, 28, for flow of said ingredients in substantially equal proportions unto the spray disc 18, whereby each sheet 10 is sprayed, or foam coated, on all sides with a foamed polyurethane coating of controlled thicknesses in a range of ⅛ inch to ⅜ inch in thickness.

Foam-providing compositions of other urethane polymers containing repeated

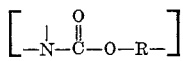

urethane linkages may also be used as foam coatings in the practice of the invention. These polymers, as is well known, are made by reacting a polyisocyanate with a compound having a plurality of active hydrogens.

In general, the urethane polymer foam coatings applied by practice of the present invention have excellent strength, durability, low density, light color, uniformity, and good heat insulating properties. They frequently tend to greatly augment and strengthen, and render much more useful for many practical purposes, many plastic foam substrates adapted to be coated therewith, especially those of an inherently somewhat weak or relatively friable nature, such as many more or less inflexible, low density plastic foam substrates.

The polyisocyanate used to make the resin may be a diisocyanate, such as hexamethylene diisocyanate, 2,4-tolylene diisocyanate, 2,6-tolylene diisocyanate, naphthalene diisocyanate-1,5, and mixtures thereof and the like. The compound mentioned above having a plurality of active hydrogens may be of polyhydroxy compound, such as a glycol, glycerol, polyesterpolyol polyetherpolyols or the like. A polyesterpolyol may be made by reacting a polybasic acid with an excess of a polyhydric alcohol. If a linear polyesterpolyol is desired, difunctional reactants should be used, such as phthalic acid or its anhydride with glycol. A polyetherepolyol may be made by condensing a polyhydroxy compound such as glycol, glycerol and sucrose with an alkylene oxide such as ethylene oxide, propylene oxide, butylene oxide or the like. Using a mixture of polypropylene oxide glycerols of the formulae:

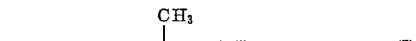

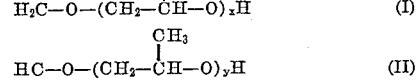

or

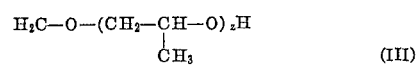

produces a rigid polymer when the sum of $x$, $y$, and $z$ is about 6 and a flexible polymer when the sum of $x$, $y$ and $z$ is about 15 or higher. Alkylene oxide-sucrose condensates produce rigid polymers when polymerized with polyisocyanates. Polymers of varying rigidity and flexibility, as is appreciated by those skilled in the art, can be tailored by selecting a condensate or a mixture of condensates of suitable molecular weight and structure to be reacted with the polyisocyanate. Other hydroxyl-rich compounds, such as condensates of ethylenediamine with propylene oxide, can be used to produce useful urethane polymers. By still another approach, polyurethanes can be made by reacting a bischloroformate with a polyamine.

Polyurethane resin foams can be made in any one of several suitable ways known to the art. Water or a carboxyl group-containing compound can be added to a reaction mixture containing polyisocyanates, whereupon carbon dioxide is liberated which causes the liquid reaction mixture to expand and foam. Alternatively, a polyurethane foam may be made by admixing a volatile liquid with one of the reactants, namely, the polyisocyanate or the compound containing a plurality of active hydrogens, before they are mixed. The volatile liquid and the reactants can all be brought together simultaneously or the volatile liquid can be mixed with the reactants shortly after they are brought together. The volatile liquid is converted to a gas when the reactants are combined due to the heat of the reaction or by external heating thereby producing small gas bubbles in the reacting liquid. Examples of suitable volatile liquids which can be used for this purpose are trichloromonofluoromethane, hexane, methylchloroform, symmetrical tetrachlorodifluoroethane, trichlorotrifluoroethane and the like.

A catalyst for the reaction between the isocyanate radical and active hydrogen can be used when making urethane polymers. This is usually desirable when a product of cellular form is to be made. Representative examples of suitable catalysts are: triethylenediamine; dibutyltin dilaurate; triethylamine; N,N-dimethylcyclohexylamine; cobalt naphthenate; stannous octoate and the like.

If desired, a cell size control agent can be added to the reaction mixture for producing au rethane polymer foam. Materials such as copolymers of polyethylene glycol and dimethylsiloxane serve to produce cells of smaller size in polyurethane foams. These materials can be made as described in British Patent No. 793,501. Representative examples of other cell size control agents are dioctyl sulfosuccinate and zinc stearate.

The sheets 10 (or other substrate to be coated) may be an alkenyl aromatic resin. These, of course are normally solid polymers of one or more polymerizable alkenyl aromatic compounds which, generally, comprise, in chemically combined form, at least about 50 percent by weight of at least one alkenyl aromatic compound having the general formula:

wherein Ar represents an aromatic hydrocarbon radical, or an aromatic halohydrocarbon radical, of the benzene series, and R is hydrogen or methyl. Examples of such alkenyl aromatic resins are the solid homopolymers of styrene, alpha-methylstyrene, ortho-methylstyrene, meta-methylstyrene, para-methylstyrene, ar-ethylstyrene, ar-vinyl xylene, ar-chlorostyrene, the solid copolymers of two or more of such alkenyl aromatic compounds with one another, and solid copolymers of one or more of such alkenyl aromatic compounds with minor amounts of other readily polymerizable olefinic compounds such as divinylbenzene, methyl-methacrylate, acrylonitrile, etc. Advantageously, a foamed styrene polymer substrate, such as polystyrene, is polyurethane foam coated in the practice of the present invention.

Polyolefin sheets may also be employed, including those comprised of the normally solid polymers and copolymers containing polymerized therein at least about 50 percent by weight of one or more polymerizable alpha-olefinic compounds, such as ethylene, propylene, and the like, particularly those of up to 8 carbon atom-containing olefins. Sheets of polyethylene or polypropylene foam are also especially desirable for use in the herein described coating method.

Other thermoplastic foam substrates which may advantageously be coated by practice of the present invention include vinyl chloride polymer and the like or similar haloethylene polymer foams, such as polyvinyl chloride foam, saran (i.e., vinylidene chloride polymer) foams, chlorinated polyethylene foams, and so forth. Likewise, the substrates may be foams of blended thermoplastic or other polymers, such as foamed polymer blends of vinyl chloride polymers and styrene polymers (i.e., blended polyvinyl chloride and polystyrene).

In addition, excellent results may also be obtained in the coating with urethane polymer foams of foam plastic substrates that are of the thermoset variety, including epoxy foams, phenolic foams, polyurethane foams, urea-formaldehyde foams, and the like or similar thermoset plastics.

The plastic substrate being coated may, if desired, contain self-extinguishing agents, plasticizers and other additives commonly employed to improve the properties of such materials. It may be of any density, high or low, or degree of flexibility desired and consistent with the material of which it is comprised.

The sheet, or core material, may be foamed or expanded by any known method depending on the particular plastic therein. In the case of thermoplastics, for example, this may be by extrusion of a mobile gel containing a blowing agent; foaming-in-place bead techniques, and so forth. Foamed thermoset plastic substrates may also be made in any suitable way. The expanded core materials and the foamed polyurethane surface covering may, of course, contain pigments, fillers, self-extinguishing agents and the like, as may be desired or appropriate for the purposes at hand.

The polyurethane foam coating may contain minor amounts of other copolymerized monomers which serve to impart desired properties for certain uses. These may include vinyl chloride to increase dimensional stability to boiling water, substituted polymethylol phenols to increase heat resistance, pigments, coloring agents, other stabilizers, self-extinguishing agents, and the like.

A core material of any desired thickness may be used. Preferably, however, planks or boards of from about ½ inch to 6 inches thick are employed. These readily achieve high strength and low "K" factors in the resulting product.

In FIG. 3 there is shown a sheet of material formed by application of the method of the invention consisting of the core 10, and a foam coating of polyurethane 42 applied to each side.

FIG. 4 illustrates an operational setup wherein each spraying station is adapted to receive a premix solution comprising urethane foam-providing ingredients of the type hereinbefore described. For such purpose, an annular-edge flat horizontal disc 44 is supported by a motor means 46, the latter being provided with an internal passageway 48, for conducting a liquid upwardly to the center of the disc 44. Power supply means (not shown) are adapted for operation of the motor means 46, as well as for providing a source of high voltage for the electrostatic charge of the material to be sprayed. A premix chamber 50, located near each motor means, is adapted to receive, from sources equivalent to the pump 24, 28 arrangement, charged ingredients. These ingredients are fed into a mixing passageway 52 under control valves 54 and 56. The mixing passageway 52 is connected to a control valve 58 via a hose 60. The control valve 58 includes a rotatable valve 62, adapted in one position to allow flow of mixed solution from the premix chamber 50 into the motor passageway 48, via a hose 64, and in a second position, to allow flow of purging liquid from a reservoir 66, via a hose 68, through a hose 70 leading to the premix chamber passageway 52. Valves 54 and 56 are adapted for simultaneous opening and closing, such action being synchronized with rotation of the valve 62.

In such manner, premix polyurethane solution may be directed to the atomizing disc 55 when valves 54 and 56 are open, and purging liquid may be passed through hoses 60, 64 and the motor means passageway 48 when the valves 54 and 56 are closed. The purging liquid may be methylene chloride, or any other liquid which serves to satisfactorily purge the premix chamber and associated hoses, etc. A metering valve 72 may be arranged in the hose 68, if desired to control the flow rate of the purging liquid.

The spraying apparatus so far described, for practicing the method of the invention, may be of the type disclosed in U.S. 2,754,226, with minor modifications.

Figure 6:
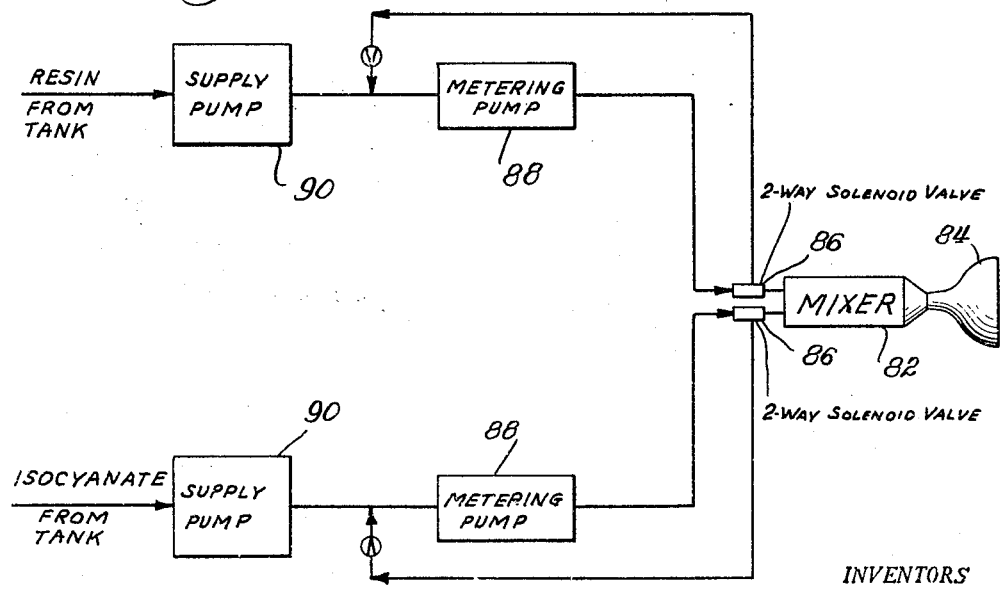

In FIGS. 5 and 6 are shown operational setups for practicing the method of the invention, utilizing spraying apparatus similar to that disclosed in U.S. 2,926,106 and U.S. 2,809,902, respectively.

As shown in FIG. 5, the spraying apparatus includes a hand-held gun 74. The gun 74 is adapted for receipt of ingredients for production of a urethane polymer foam. These ingredients flow from a metering unit 76 which is supplied by pumps similar to pumps 24 and 28. The gun 74 includes a trigger means 78 which is arranged to provide operative control of the metering unit 76. The latter may include a plurality of solenoid operated valves (not shown) to provide the necessary operating functions. Valve means (not shown) may be provided for supplying a purging liquid to the gun 74, when it is not being used for spraying, as in the manner of the embodiment described in connection with FIG. 4. It will be seen that the apparatus shown in the FIG. 5 arrangement may be used to deliver a premix polyurethane foam to the gun for atomization and spraying by a revolvable disc 80 arranged at the forward end of the gun.

The arrangement shown in FIG. 6 is similar to that shown in FIG. 5 insofar as the ingredients for a polyurethane foam are delivered to a gun type mixer 82 having a spray producing disc 84. However, the apparatus of the FIG. 6 embodiment includes a pair of two-way solenoid valves 86, which are adapted to provide recirculation of the components when spraying operations are temporarily disrupted. A metering pump 88 is arranged in each supply line leading to the valves 86, while supply pumps 90 are provided for delivery of polyurethane foam ingredients from supply tanks (not shown) to each metering pump 88.

It will be apparent to those skilled in the art, that structural details not shown in the FIGS. 5 and 6 embodiments, may be readily supplied to provide the necessary operational sequence required for practice of the method of the invention. It will also be apparent that the practice of the method of the invention will satisfy the objectives hereinbefore delineated.

Practice of the method of the present invention, as has been demonstrated and clearly appears in the foregoing, secures many benefits and advantages that are generally difficult, if at all possible, to obtain in any other way. For example, the present method permits avoidance of foam loss through overspray and the like which is generally encountered in other types of spraying operations. Furthermore, particularly with certain varieties of urethane polymer foam-providing compositions, it minimizes toxicity and health problems by efficient distribution of the coating especially when the operation is performed in relatively confined and/or poorly ventilated places. Following of the present techniques in any given coating installation avoids, for example, the ordinarily conventional necessity to have water-washed walls in spray booths or other points of installation in order to provide collection of overspray on the walls in the immediate vicinity of the coating operation. Since the applied coating is effectively substantially all if not entirely directed to the substrate being coated, problems of the indicated variety are nicely circumvented.

Other foam coating materials may also be utilized in ways analogous to those described in the foregoing, such as foam coating of various plastic and other substrates with epoxy foam-providing compositions of suitable variety as will appear to those skilled in the art.

The foregoing description has been given in detail without thought of limitation since the inventive principles involved are capable of assuming other forms with-

What is claimed is:

1. A method for uniformly and economically coating a polymeric resinous article with a polyurethane foam comprising placing the article to be coated on a support within the operating range of a rotating disc spray means, electrically grounding the support for said article, appplying a high voltage electrostatic charge to said spray means, supplying a catalyzed prepolymer adduct which will react with a crosslinker to form said polyurethane foam to the center of said disc spray means, simultaneously but separately supplying said crosslinker and a foam agent to form said polyurethane foam to the center of said spray means whereby said adduct and said crosslinker are optimally mixed and sprayed outwardly upon said article as fine spray particles, each particle having said high voltage electrostatic charge, whereby maximum utilization of said adduct and crosslinker is attained and a uniform smooth-faced coating is formed on said article.

2. A method for uniformly and economically coating an article formed of an expanded polymer resin selected from the group consisting of alkenyl aromatic resins and alpha olefin resins with a polyurethane foam comprising placing the article to be coated on a support within the operating range of a rotating disc spray means, electrically grounding the support for said article, applying a high voltage electrostatic charge to said spray means, supplying a catalyzed prepolymer adduct which will react with a crosslinker to form said polyurethane foam to the center of said disc spray means, simultaneously but separately supplying said crosslinker and a foam agent to form said polyurethane foam to the center of said disc spray means whereby said adduct and said crosslinker are optimally mixed and sprayed outwardly upon said article as fine spray particles, each particle having said high voltage electrostatic charge, whereby maximum utilization of said adduct and crosslinker is attained and a uniform smooth-faced coating is formed on said resin article.

3. A method for uniformly and economically coating an article formed of an expanded polymer resin selected from the group consisting of alkenyl aromatic resins and alpha olefin resins with a polyurethane foam comprising placing said article to be coated on a support within the operating range of a rotating disc spray means having a central dished portion, electrically grounding the support for said article, applying a high voltage electrostatic charge to said spray means, supplying a prepolymer adduct which will react with a crosslinker to form said polyurethane foam to said dished portion of said disc spray means, simultaneously but separately supplying said crosslinker and a foam agent to form said polyurethane foam to said dished portion whereby said adduct and said crosslinker are optimally mixed and sprayed outwardly upon said article as fine spray particles, each particle having said high voltage electrostatic charge, whereby maximum utilization of said adduct and crosslinker is attained with minimum loss of foamability and a uniform smooth-faced coating is formed on said resin article.

4. The method of claim 3 wherein said resin article comprises expanded polystyrene.

5. The method of claim 3 wherein said resin article comprises expanded polyethylene.

6. The method of claim 3 wherein said adduct is a butylene oxide prepolymer adduct prepared by reacting glycerine-butylene oxide triol and tolylene diisocyanate together.

7. The method of claim 3 wherein said crosslinker is a butylene oxide crosslinker prepared by reacting glycerine and sucrose and butylene oxide.

References Cited in the file of this patent

UNITED STATES PATENTS

| | | |
|---|---|---|
| 2,595,342 | Dosmann | May 6, 1952 |
| 2,694,743 | Ruskin et al. | Nov. 16, 1954 |
| 2,753,277 | Smithers | July 3, 1956 |
| 2,754,226 | Juvinall | July 10, 1956 |
| 2,779,689 | Reis | Jan. 29, 1957 |
| 2,794,417 | Starkey et al. | June 4, 1957 |
| 2,866,722 | Gensel et al. | Dec. 30, 1958 |
| 2,879,197 | Muskat et al. | Mar. 24, 1959 |
| 2,906,642 | Dennis | Sept. 29, 1959 |
| 2,926,106 | Gauthier | Feb. 23, 1960 |
| 2,955,056 | Knox | Oct. 4, 1960 |
| 2,955,058 | Foster | Oct. 4, 1960 |
| 2,975,756 | Reindl et al. | Mar. 21, 1961 |
| 2,993,808 | Thornberry | July 25, 1961 |
| 3,011,472 | Kent et al. | Dec. 5, 1961 |
| 3,029,172 | Glass | Apr. 10, 1962 |